United States Patent
Wang et al.

(10) Patent No.: US 6,767,970 B2
(45) Date of Patent: Jul. 27, 2004

(54) PPE COPOLYMERS, PREPARATION THEREOF, AND RESIN COMPOSITION UTILIZING THE SAME

(75) Inventors: Shin-Shin Wang, Hsinchu (TW); Jie-Hwa Ma, Hsinchu (TW); Jong-Lieh Yang, Hsinchu (TW); Kuo-Yuan Hsu, Miaoli (TW); Li-Chung Liang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 73 days.

(21) Appl. No.: 10/308,125

(22) Filed: Dec. 3, 2002

(65) Prior Publication Data

US 2003/0225220 A1 Dec. 4, 2003

(30) Foreign Application Priority Data

May 24, 2002 (TW) ..................................... 91111095 A

(51) Int. Cl.$^7$ .............................................. C08F 283/08

(52) U.S. Cl. ...................... 525/391; 528/205; 528/208; 528/210; 528/217; 528/218

(58) Field of Search ........................ 525/391; 528/205, 528/208, 210, 217, 218

(56) References Cited

PUBLICATIONS

Abstract of Perrin, J. Applied Polymer Science, 2000, pp1054–1067.*

* cited by examiner

*Primary Examiner*—Philip Tucker
*Assistant Examiner*—D. Aylward
(74) *Attorney, Agent, or Firm*—Sughrue Mion, PLLC

(57) ABSTRACT

PPE copolymers comprise three repeating units. The PPE copolymers are polymerized with 2,6-DMP, dialkenylamide or dialkenylamine phenol, and another phenol derivative. A resin composition having a low cross-linking temperature is also disclosed, which comprises the PPE copolymer and a free radical initiator.

34 Claims, No Drawings

PPE COPOLYMERS, PREPARATION THEREOF, AND RESIN COMPOSITION UTILIZING THE SAME

BACKGROUND OF THE INVENTION

1. Field of the Invention

The present invention relates to polyphenylene ether copolymers (PPE copolymers), preparation thereof, and resin composition utilizing the same. Particularly, the present invention relates to synthesis of PPE copolymers with thermosetting properties and cross-linking ability and their resin compositions as well.

2. Description of the Related Art

PPE resins have good electric properties because their dissipation factor (Df) is only about 0.007 and dielectric constant (Dk) is as low as about 2.4~2.5. Furthermore, they also have high glass transition temperature (Tg), about 210° C., and low water absorption, about 0.5%, and are good at acid and base resistance.

PPE as a thermoplastic resin, however, has very poor heat and solvent resistance. These shortcomings must be solved before PPE can be seriously considered as a material for laminate application. To date, the most effective way to solve these shortcomings has been made by transferring the thermoplastic PPE to thermosetting PPE.

Such transformation has been made as indicated in European Patent No. 382312. This patent discloses that the —CH3 side group on PPE is first lithiated by n-butyllithium (n-BuLi) and then reacted with allyl halide (CH2=CHCH2X; X=Cl, Br, I) to form —CH2CH2CH=CH2. Hence a thermosetting PPE is obtained (hereafter referred to as APPE).

European Patent No. 382312 also shows that the curing reactions of APPE, peroxide and triallyl isocyanurate (TAIC) are affected only at high temperatures, 250° C. or higher. This temperature range is too high for the common laminating process in industry. Thus, it is necessary to lower the laminating temperature to under 200° C. before a thermosetting PPE can be practically used as a laminate.

SUMMARY OF THE INVENTION

Therefore, an object of the present invention is to solve the above-mentioned problems and to provide a method of transferring the original thermoplastic PPE to thermosetting PPE derivatives with better heat and solvent resistance for the laminate application.

Another object of the present invention is to provide thermosetting PPE derivatives with curing temperatures lower than 200° C. This temperature capability is adequate to the common industrial laminating process.

A further object of the present invention is to provide a resin composition comprising modified PPE copolymer with low cross-linking temperature and self-cross-linking ability for laminate.

DETAILED DESCRIPTION OF THE INVENTION

The present invention provides PPE copolymers having a dialkenylamide group, wherein the alkenyl group is $C_2$–$C_{10}$ linear alkenyl group, with the following formula (V)

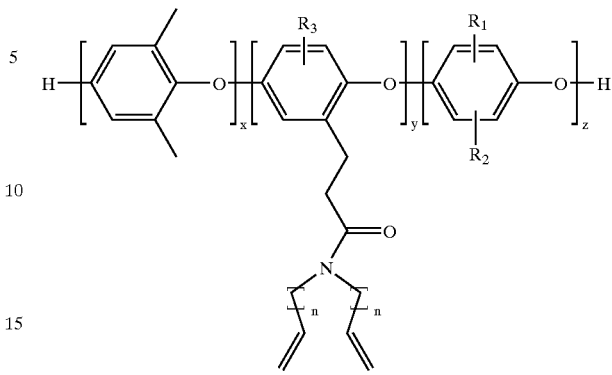

wherein x, y and z each represent mole percentage of each repeating unit, where x is from 1 to 80%, y is from 1 to 10% and z is from 1 to 40%, provided that the sum of x, y and z is 100%, n is 0 or an integer from 1 to 10, $R_1$ represents H, or $C_1$–$C_{10}$ linear or branched alkyl group, $R_2$ represents H, $C_1$–$C_{10}$ linear or branched alkyl group, or $C_2$–$C_{10}$ linear or branched alkenyl group, and $R_3$ represents H, or $C_2$–$C_{10}$ linear or branched alkenyl group.

A specific example of the PPE copolymer is where $R_1$ is H, $R_2$ is an allyl group, and $R_3$ is H, or $R_1$ is H, $R_2$ is an isopropyl group, and $R_3$ is H.

The process for preparing the above-mentioned PPE copolymer of the formula (V) involves admixing monomer (a), monomer (b) and monomer (c) in an organic solvent in the presence of an alkali, a copper(I) catalyst and oxygen, wherein monomer (a): having a dialkenylamide group, wherein the alkenyl group is $C_2$–$C_{10}$ linear alkenyl group, the monomer (a) represented by the following formula (II)

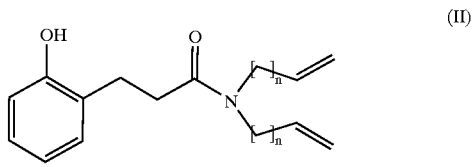

n = 0–10 wherein the monomer (a) is synthesized by admixing and heating dihydrocoumarine and a component represented by the following formula (I) in another organic solvent,

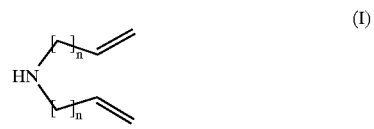

n = 0–10 monomer (b): 2,6-dimethylphenol (2,6-DMP) represented by the following formula (III)

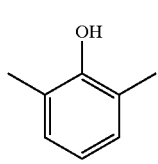

(III)

monomer (c): represented by the following formula (IV)

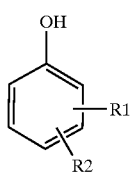

(IV)

wherein
  $R_1$ represents H or $C_1$–$C_{10}$ linear or branched alkyl group, and
  $R_2$ represents H, $C_1$–$C_{10}$ linear or branched alkyl group, or $C_2$–$C_{10}$ linear or branched alkenyl group.

The present invention provides another PPE copolymer having a dialkenylamine group, wherein the alkenyl group is $C_2$–$C_{10}$ linear alkenyl group, with the following formula (VII)

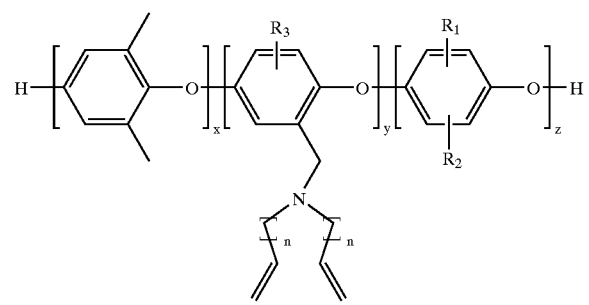

(VII)

wherein
  x, y and z each represent mole percentage of each repeating unit, where x is from 1 to 80%, y is from 1 to 10% and z is from 1 to 40%, provided that the sum of x, y and z is 100%,
  n is 0 or an integer from 1 to 10,
  $R_1$ represents H, or $C_1$–$C_{10}$ linear or branched alkyl group,
  $R_2$ represents H, $C_1$–$C_{10}$ linear or branched alkyl group, or $C_2$–$C_{10}$ linear or branched alkenyl group, and
  $R_3$ represents H, or $C_2$–$C_{10}$ linear or branched alkenyl group.

A specific example of the PPE copolymer is where $R_1$ is H, $R_2$ is allyl group, and $R_3$ is H, or $R_1$ is H, $R_2$ is an isopropyl group, and $R_3$ is H.

The process for preparing the above-mentioned PPE copolymer of the formula (VII) includes admixing monomer (d), monomer (b) and monomer (c) in an organic solvent in the presence of an alkali, a copper(I) catalyst and oxygen, wherein monomer (d): having a dialkenylamine group, wherein the alkenyl group is $C_2$–$C_{10}$ linear alkenyl group, the monomer (d) represented by the following formula (VI)

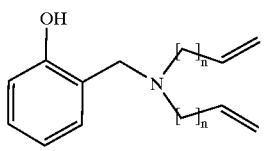

(VI)

n = 0–10 monomer (b): 2,6-dimethylphenol (2,6-DMP) represented by the following formula (III)

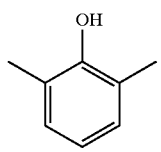

(III)

monomer (c): represented by the following formula (IV)

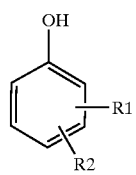

(IV)

wherein
  $R_1$ represents H or $C_1$–$C_{10}$ linear or branched alkyl group, and
  $R_2$ represents H, $C_1$–$C_{10}$ linear or branched alkyl group, or $C_2$–$C_{10}$ linear or branched alkenyl group.

For preparing the PPE copolymers with the formula (V) or (VII), the copper(I) catalyst can be copper(I) oxide ($Cu_2O$) or copper(I) halide. A specific example of the copper(I) halide is Copper(I) Chloride (CuCl) or Copper(I) bromide (CuBr).

The preferred alkali is pyridine or tertiary amine, such as triethylamine.

The preferred organic solvent used to prepare the PPE copolymers is toluene or xylene.

A specific example of the monomer (c) is 2-isopropylphenol and 2-allyl-6-methylphenol.

The PPE copolymers of formula (V) and (VII) have thermosetting property, low cross-linking temperature (less than 200° C.), and self-cross-linking ability due to double bonds in side chain.

Furthermore, because 2,6-DMP and the component of formula (II) having a dialkenylamide group or the component of formula (VI) having a dialkenylamine group are copolymerized with the present of the monomer of formula (IV), PPE copolymers have good solvent resistance and good solubility in specific solvents. According to these advantages, the PPE copolymers of formula (V) and (VII) can be applied to laminate. A detailed description of resin compositions having the PPE copolymers of formula (V) and (VII) is given.

A resin composition of the present invention comprises:
  a) PPE copolymer with the formula (V) or (VII);
  b) a free radical initiator present in an amount ranging from 0.5 to 95% by weight of the resin composition.

The free radical initiator used in the resin composition of the present invention is 2,5-dimethyl-2,5-di-tertbutylperoxy-hexane (DHBP), di-tert-butylperoxide (DTBP), di-cumylperoxide (DCP), or benzoylperoxide (BPO).

The above-mentioned resin composition further comprises a hardener present in an amount ranging from 5 to 95% by weight of the resin composition. The hardener can be triallyl isocyanurate (TAIC) or triallyl cyanurate (TAC).

The following examples are intended to illustrate the process and the advantages of the present invention more fully without limiting its scope, since numerous modifications and variations will be apparent to those skilled in the art. Unless otherwise indicated, all parts, percents, ratios and the like are by weight.

EXAMPLE 1

Synthesis of Monomer (a):

N,N-diallyl-3-(2-hydroxy-phenyl)-propionamide.

19.5 g of dihydrocoumarine was placed in a 250 ml round bottom flask with 20 ml of diallyl amine and 60 ml of toluene. The reaction mixture was stirred for 6 hrs at 50° C. The reaction mixture was then cooled, concentrated, and extracted with ethyl acetate and water. The organic phase was collected and concentrated to obtain dried solid. The obtained solid was recrystallized with ethyl acetate/n-hexane, filtered, washed with n-hexane, and vacuumed to dryness. 17.2 g of the product of formula (VIII) was obtained.

The reaction step is illustrated as follows:

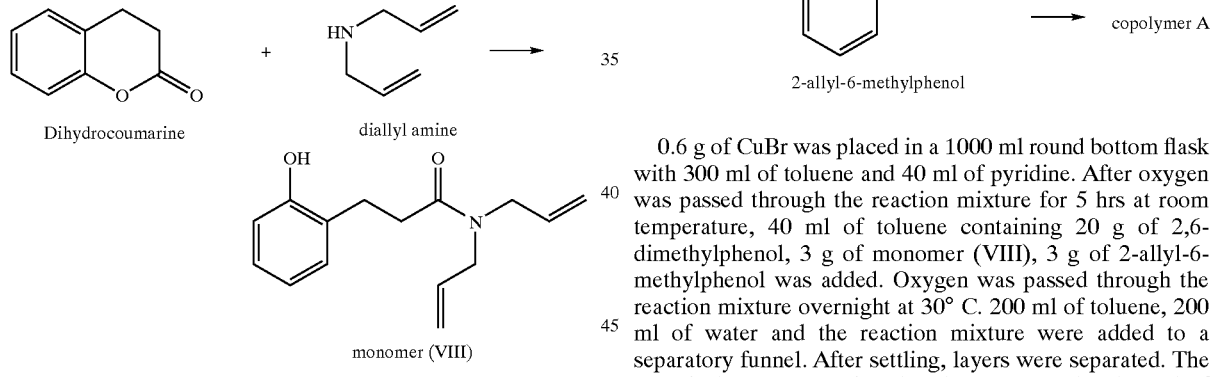

EXAMPLE 2

Synthesis of Monomer (d):

2-diallylaminomethyl-phenol 12 g of 2-hydroxybenzaldehyde was placed in a 500 ml round bottom flask with 100 ml of diallyl amine and 100 ml of methanol. The reaction mixture was then cooled to 0° C. 4 g of NaBH$_4$ (powder) was slowly added within 2.5 hrs and the temperature was kept at 0–6° C. Water was then added to the reaction mixture to terminate the reaction. The reaction mixture was then concentrated, and extracted with ethyl acetate and water. The organic phase was collected and concentrated to obtain crude product. The obtained crude product was eluted and purified with mobile phase eluant of n-hexane:ethylacetate (EA)=4: 1 and solid phase of silica gel. 12.8 g of the product of formula (IX) was obtained and recovery yield was 64%.

The reaction step is illustrated as follows:

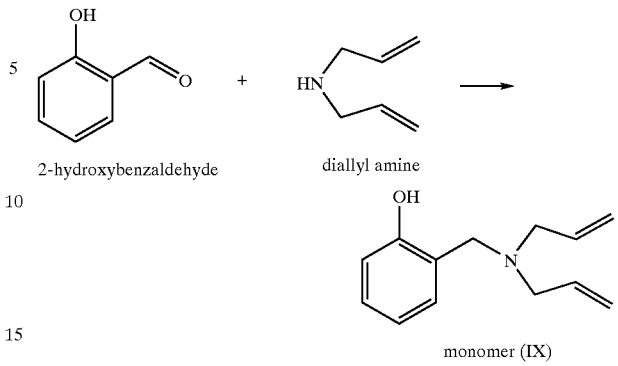

EXAMPLE 3

Synthesis of Copolymer A

The reaction step is illustrated as follows:

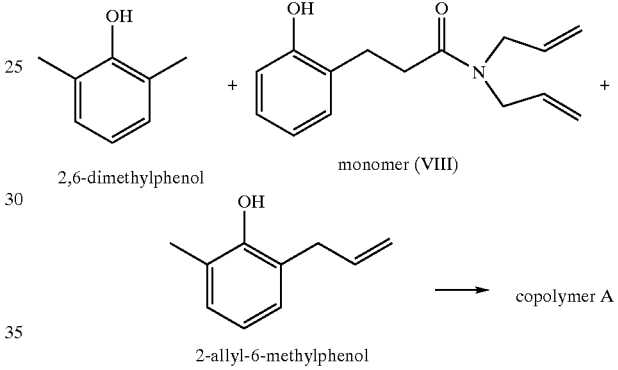

0.6 g of CuBr was placed in a 1000 ml round bottom flask with 300 ml of toluene and 40 ml of pyridine. After oxygen was passed through the reaction mixture for 5 hrs at room temperature, 40 ml of toluene containing 20 g of 2,6-dimethylphenol, 3 g of monomer (VIII), 3 g of 2-allyl-6-methylphenol was added. Oxygen was passed through the reaction mixture overnight at 30° C. 200 ml of toluene, 200 ml of water and the reaction mixture were added to a separatory funnel. After settling, layers were separated. The organic layer was retrieved and concentrated. 1500 ml of methanol and 5 ml of 6N HCl$_{(aq)}$ were slowly dropped to the concentrator, and stirred overnight. After settling, liquid was poured out. 1500 ml of methanol and 5 ml of 6N HCl$_{(aq)}$ were added again. The reaction mixture was filtered, stirred in 500 ml of water for 4 hrs, filtered again, and stripped under vacuum to remove solvent. 16 g of product (copolymer A) was obtained, and its properties are listed in Table 1.

EXAMPLE 4

Synthesis of Copolymer B

The reaction step is the same as example 3, and the difference being the proportions of reactants.

1.8 g of CuBr was placed in a 1000 ml round bottom flask with 900 ml of toluene and 120 ml of pyridine. After oxygen was passed through the reaction mixture for 5 hrs at room temperature, 40 ml of toluene containing 60 g of 2,6-dimethylphenol, 7.5 g of monomer (VIII), 9 g of 2-allyl-6-methylphenol was added. Oxygen was passed through the reaction mixture overnight at 30° C. 200 ml of toluene, 200 ml of water and the reaction mixture were added to a separatory funnel. After settling, layers were separated. The organic layer was retrieved and concentrated. 1500 ml of methanol and 5 ml of 6N $HCl_{(aq)}$ were slowly dropped to the concentrator, and stirred overnight. After settling, liquid was poured out. 1500 ml of methanol and 5 ml of 6N $HCl_{(aq)}$ were added again. The reaction mixture was filtered, stirred in 500 ml of water for 4 hrs, filtered again, and stripped under vacuum to remove solvent. 18 g of product (copolymer B) was obtained, and its properties are listed in Table 1.

TABLE 1

Physical properties of the copolymers A and B and their application in substrate

|  | Copolymer A | Copolymer B |
|---|---|---|
| double bond content of allyl (%) | 5.4 | 8.6 |
| double bond content of amide (%) | 8.1 | 7.3 |
| Number average molecular weight (Mn) | 18701 | 20555 |
| Weight average molecular weight (Mw) | 95323 | 79855 |
| $D_k$ (1/30 MHz) | <2.8 | 2.69/2.68 |
| $D_f$ (1/30 MHz) | 0.0067/0.004 | 0.0066/0.0048 |
| $T_g$ (° C.) | 188 (DMA) | 200 (DMA) |

EXAMPLE 5

Synthesis of Copolymer C

The reaction step is illustrated as follows:

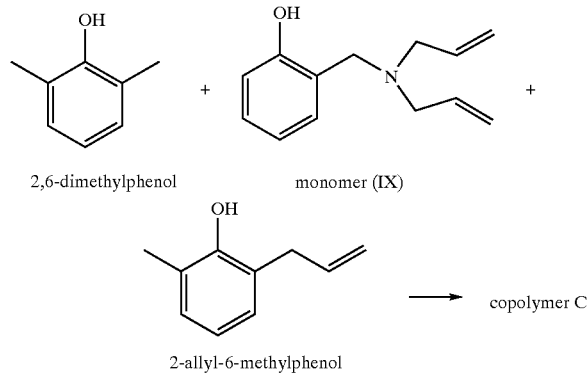

2,6-dimethylphenol    monomer (IX)

2-allyl-6-methylphenol

→ copolymer C 0.6 g of CuBr was placed in a 1000 ml round bottom flask with 300 ml of toluene and 40 ml of pyridine. After oxygen was passed through the reaction mixture for 5 hrs at room temperature, 40 ml of toluene containing 20 g of 2,6-dimethylphenol, 20 g of monomer (IX), 2 g of 2-allyl-6-methylphenol was added. Oxygen was passed through the reaction mixture overnight at 30° C. 200 ml of toluene, 200 ml of water and the reaction mixture were added to a separatory funnel. After settling, layers were separated. The organic layer was retrieved and concentrated. 1500 ml of methanol and 5 ml of 6N $HCl_{(aq)}$ were slowly dropped to the concentrator, and stirred overnight. After settling, liquid was poured out. 800 ml of methanol and 5 ml of 6N $HCl_{(aq)}$ were added to the precipitate, and stirred for 4 hrs. The reaction mixture was filtered, stirred in 500 ml of water for 4 hrs, filtered, stirred in 500 ml of methanol for 4 hrs, filtered again, and stripped under vacuum to remove solvent. 16 g of product (copolymer C) was obtained, and its properties are listed in Table 2.

TABLE 2

Physical properties of the copolymer C and its application in substrate

|  | Copolymer C |
|---|---|
| double bond content of allyl (%) | 4.7 |
| double bond content of amine (%) | 1.2 |
| Number average molecular weight (Mn) | 10273 |
| Weight average molecular weight (Mw) | 25647 |
| $D_k$ (1/30 MHz) | 2.61/2.61 |
| $D_f$ (1/30 MHz) | 0.003/0.002 |
| $T_g$ (° C.) (DMA) | 139 |

EXAMPLE 6

Synthesis of Copolymer D

The reaction step is illustrated as follows:

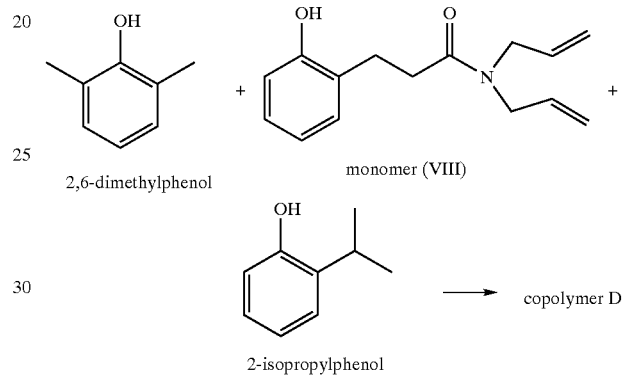

2,6-dimethylphenol    monomer (VIII)

2-isopropylphenol → copolymer D 0.6 g of CuBr was placed in a 1000 ml round bottom flask with 300 ml of toluene and 40 ml of pyridine. After oxygen was passed through the reaction mixture for 5 hrs at room temperature, 40 ml of toluene containing 20 g of 2,6-dimethylphenol, 2.6 g of monomer (VIII), 3 g of 2-isopropylphenol was added. Oxygen was passed through the reaction mixture overnight at 30° C. 200 ml of toluene, 200 ml of water and the reaction mixture were added to a separatory funnel. After settling, layers were separated. The organic layer was retrieved and concentrated. 1500 ml of methanol and 5 ml of 6N $HCl_{(aq)}$ were slowly dropped to the concentrator, and stirred overnight. After settling, liquid was poured out. 1500 ml of methanol and 5 ml of 6N $HCl_{(aq)}$ were added again, and stirred for 4 hrs. After settling, solvent was poured out again. 800 ml of methanol and 5 ml of 6N $HCl_{(aq)}$ were added again, and stirred for 4 hrs. The reaction mixture was filtered, stirred in 500 ml of water for 4 hrs, filtered, stirred in 500 ml of methanol for 4 hrs, filtered again, and stripped under vacuum to remove solvent. 16 g of product (copolymer D) was obtained, and its properties are listed in Table 3.

TABLE 3

Physical properties of the copolymer D and its application in substrate

|  | Copolymer D |
|---|---|
| content of 2-isopropylphenol (%) | 22.4 |
| double bond content of amide (%) | 3 |
| $D_k$ (1/30 MHz) | 2.74/2.71 |
| $D_f$ (1/30 MHz) | 0.0062/0.0042 |
| $T_g$ (° C.) (DMA) | 171 |

EXAMPLE 7
Preparation of PPE Resin Composition with Copolymer A 4.5 g of copolymer A, 40.38 g of toluene, 1.15 g of TAIC and 0.175 g of DHBP were placed in a round-bottom flask. The mixture was stirred thoroughly and stripped of solvent by vacuum. The residual mixture was pressed at 200° C. for 60 mins to give a sample sheet for measurement. The dissipation factor ($D_f$) and dielectric constant ($D_k$) of the sample were measured by a dielectric analyzer, the glass transition temperature ($T_g$) was measured by a dynamic mechanical analyzer (DMA), and the curing temperature was measured by a rheometer. The results of these measurements are tabulated in Table 1.

EXAMPLE 8
Preparation of PPE Resin Composition with Copolymer B 5.01 g of copolymer B, 43 g of toluene, 1.25 g of TAIC and 0.22 g of DHBP were placed in a round-bottom flask. The mixture was stirred thoroughly and stripped of solvent by vacuum. The residual mixture was pressed at 200° C. for 60 mins to give a sample sheet for measurement. The dissipation factor ($D_f$) and dielectric constant ($D_k$) of the sample were measured by a dielectric analyzer, the glass transition temperature ($T_g$) was measured by a dynamic mechanical analyzer (DMA), and the curing temperature was measured by a rheometer. The results of these measurements are tabulated in Table 1.

EXAMPLE 9
Preparation of PPE Resin Composition with Copolymer C 4.5 g of copolymer C, 16.12 g of toluene, 1.126 g of TAIC and 0.170 g of DHBP were placed in a round-bottom flask. The mixture was stirred thoroughly and stripped of solvent by vacuum. The residual mixture was pressed at 200° C. for 60 mins to give a sample sheet for measurement. The dissipation factor ($D_f$) and dielectric constant ($D_k$) of the sample were measured by a dielectric analyzer, the glass transition temperature ($T_g$) was measured by a dynamic mechanical analyzer (DMA), and the curing temperature was measured by a rheometer. The results of these measurements are tabulated in Table 2.

EXAMPLE 10
Preparation of PPE Resin Composition with Copolymer D 5.0 g of copolymer D, 15.06 g of toluene, 1.25 g of TAIC and 0.2 g of DHBP were placed in a round-bottom flask. The mixture was stirred thoroughly and stripped of solvent by vacuum. The residual mixture was pressed at 200° C. for 60 mins to give a sample sheet for measurement. The dissipation factor ($D_f$) and dielectric constant ($D_k$) of the sample were measured by a dielectric analyzer, the glass transition temperature ($T_g$) was measured by a dynamic mechanical analyzer (DMA), and the curing temperature was measured by a rheometer. The results of these measurements are tabulated in Table 3.

As mentioned above, the modified PPE copolymers provided by the present invention are thermosetting and available for cross-linking, therefore, can be applied for substrate fabrication with the advantages of easy fabrication and low cost. The modified PPE copolymers have high glass transition temperature ($T_g$) and good electric properties in terms of dissipation factor ($D_f$), less than 0.005, and dielectric constant ($D_k$), about 2.6~2.8. It is important to note that the curing temperatures of all the modified PPE copolymers are well below 200° C. and have self-cross-linking abilities. Therefore, these modified PPE copolymers can be applied to laminate at laminating temperatures lower than 200° C.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A PPE copolymer having a dialkenylamide group, wherein the alkenyl group is $C_2$–$C_{10}$ linear alkenyl group, the PPE copolymer represented by the following formula (V)

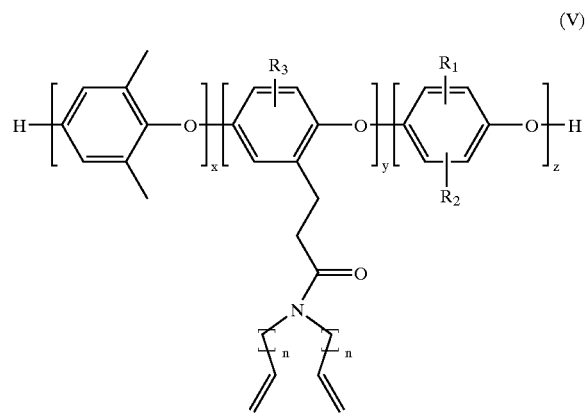

(V)

wherein x, y and z each represent mole percentage of each repeating unit, where x is from 1 to 80%, y is from 1 to 10% and z is from 1 to 40%, provided that the sum of x, y and z is 100%, n is 0 or an integer from 1 to 10, $R_1$ represents H, or $C_1$–$C_{10}$ linear or branched alkyl group, $R_2$ represents H, $C_1$–$C_{10}$ linear or branched alkyl group, or $C_2$–$C_{10}$ linear or branched alkenyl group, and $R_3$ represents H, or $C_2$–$C_{10}$ linear or branched alkenyl group.

2. The PPE copolymer as claimed in claim 1, wherein $R_1$ is H, $R_2$ is allyl group, and $R_3$ is H.

3. The PPE copolymer as claimed in claim 1, wherein $R_1$ is H, $R_2$ is an isopropyl group, and $R_3$ is H.

4. A PPE copolymer having a dialkenylamine group, wherein the alkenyl group is $C_2$–$C_{10}$ linear alkenyl group, the PPE copolymer represented by the following formula (VII)

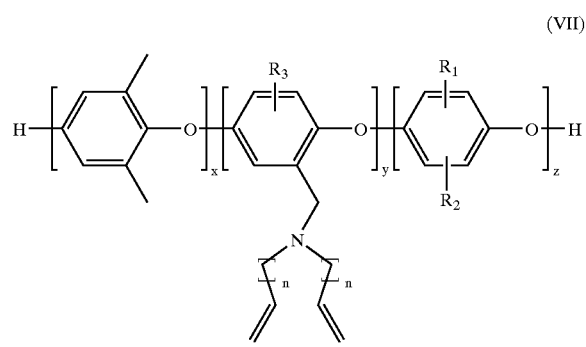

(VII)

wherein x, y and z each represent mole percentage of each repeating unit, where x is from 1 to 80%, y is from 1 to 10% and z is from 1 to 40%, provided that the sum of x, y and z is 100%, n is 0 or an integer from 1 to 10, $R_1$ represents H, or $C_1$–$C_{10}$ linear or branched alkyl group, $R_2$ represents H, $C_1$–$C_{10}$ linear or branched alkyl group, or $C_2$–$C_{10}$ linear or branched alkenyl group, and $R_3$ represents H, or $C_2$–$C_{10}$ linear or branched alkenyl group.

5. The PPE copolymer as claimed in claim 4, wherein $R_1$ is H, $R_2$ is allyl group, and $R_3$ is H.

6. The PPE copolymer as claimed in claim 4, wherein $R_1$ is H, $R_2$ is an isopropyl group, and $R_3$ is H.

7. A process for preparing a PPE copolymer, comprising the steps of:

admixing monomer (a), monomer (b) and monomer (c) in an organic solvent in the presence of an alkali, a copper(I) catalyst and oxygen, thereby obtaining the PPE copolymer represented by the following formula (V), wherein monomer (a): having a dialkenylamide group, wherein the alkenyl group is $C_2$–$C_{10}$ linear alkenyl group, the monomer (a) represented by the following formula (II)

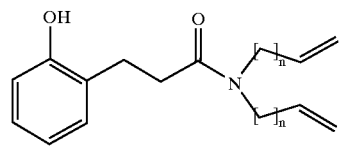

n = 0–10

(II)

wherein the monomer (a) is synthesized by admixing and heating dihydrocoumarine and a component represented by the following formula (I) in another organic solvent,

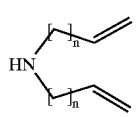

n = 0–10

(I)

monomer (b): 2,6-DMP represented by the following formula (III)

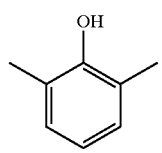

(III)

monomer (c): represented by the following formula (IV)

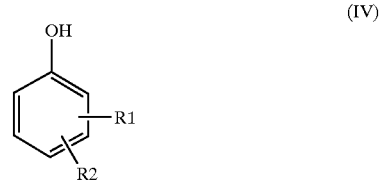

(IV)

wherein $R_1$ represents H or $C_1$–$C_{10}$ linear or branched alkyl group, $R_2$ represents H, $C_1$–$C_{10}$ linear or branched alkyl group, or $C_2$–$C_{10}$ linear or branched alkenyl group, PPE copolymer: represented by the following formula (V)

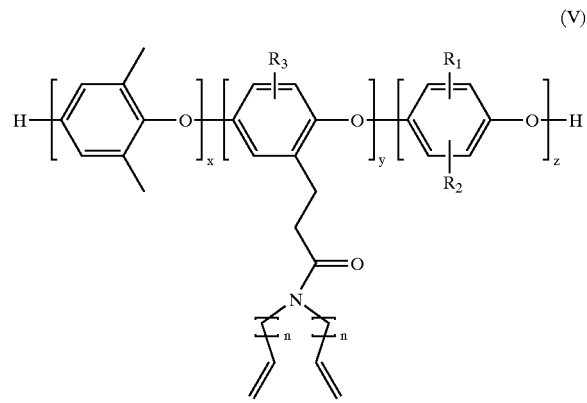

(V)

wherein x, y and z each represent mole percentage of each repeating unit, where x is from 1 to 80%, y is from 1 to 10% and z is from 1 to 40%, provided that the sum of x, y and z is 100%, n is 0 or an integer from 1 to 10, $R_1$ represents H, or $C_1$–$C_{10}$ linear or branched alkyl group, $R_2$ represents H, $C_1$–$C_{10}$ linear or branched alkyl group, or $C_2$–$C_{10}$ linear or branched alkenyl group, and $R_3$ represents H, or $C_1$–$C_{10}$ linear or branched alkyl group.

8. The process for preparing the PPE copolymer as claimed in claim 7, wherein the copper(I) catalyst is copper (I) oxide ($Cu_2O$) or copper(I) halide.

9. The process for preparing the PPE copolymer as claimed in claim 8, wherein the copper(I) halide is Copper(I) Chloride (CuCl) or Copper(I) bromide (CuBr).

10. The process for preparing the PPE copolymer as claimed in claim 7, wherein the alkali is pyridine or tertiary amine.

11. The process for preparing the PPE copolymer as claimed in claim 10, wherein the tertiary amine is triethylamine.

12. The process for preparing the PPE copolymer as claimed in claim 7, wherein the organic solvent is toluene or xylene.

13. The process for preparing the PPE copolymer as claimed in claim 7, wherein the monomer (c) is 2-allyl-6-methylphenol.

14. The process for preparing the PPE copolymer as claimed in claim 7, wherein the monomer (c) is 2-isopropylphenol.

15. A process for preparing a PPE copolymer, comprising the steps of:

admixing monomer (d), monomer (b) and monomer (c) in an organic solvent in the presence of an alkali, a copper(I) catalyst and oxygen, thereby obtaining the PPE copolymer represented by the following formula (VII), wherein monomer (d): having a dialkenylamine group, wherein the alkenyl group is $C_2$–$C_{10}$ linear alkenyl group, the monomer (d) represented by the following formula (VI)

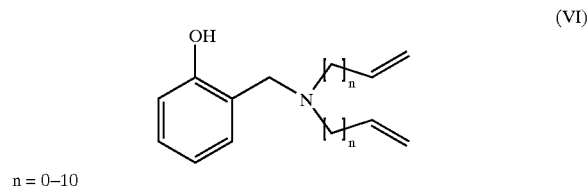

(VI)

n = 0–10 monomer (b): 2,6-DMP represented by the following formula (III)

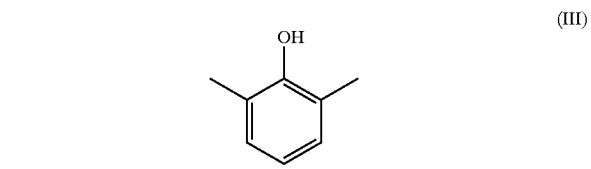

(III)

monomer (c): represented by the following formula (IV)

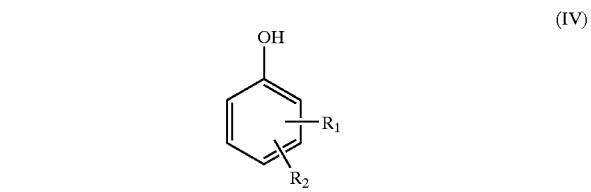

(IV)

wherein $R_1$ represents H or $C_1$–$C_{10}$ linear or branched alkyl group, and $R_2$ represents H, $C_1$–$C_{10}$ linear or branched alkyl group, or $C_2$–$C_{10}$ linear or branched alkenyl group, PPE copolymer: represented by the following formula (VII)

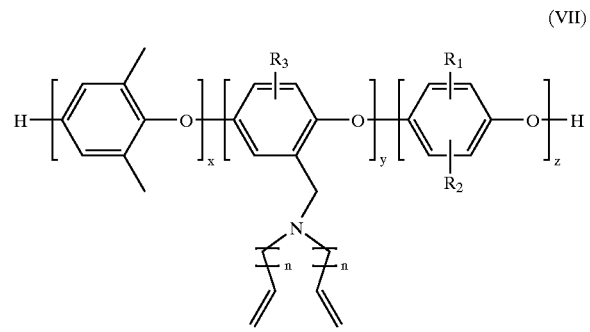

(VII)

wherein x, y and z each represent mole percentage of each repeating unit, where x is from 1 to 80%, y is from 1 to 10% and z is from 1 to 40%, provided that the sum of x, y and z is 100%, n is 0 or an integer from 1 to 10, $R_1$ represents H, or $C_1$–$C_{10}$ linear or branched alkyl group, $R_2$ represents H, $C_1$–$C_{10}$ linear or branched alkyl group, or $C_2$–$C_{10}$ linear or branched alkenyl group, and $R_3$ represents H, or $C_1$–$C_{10}$ linear or branched alkyl group.

16. The process for preparing the PPE copolymer as claimed in claim 15, wherein the copper(I) catalyst is copper(I) oxide ($Cu_2O$) or copper(I) halide.

17. The process for preparing the PPE copolymer as claimed in claim 16, wherein the copper(I) halide is Copper (I) Chloride (CuCl) or Copper(I) bromide (CuBr).

18. The process for preparing the PPE copolymer as claimed in claim 15, wherein the alkali is pyridine or tertiary amine.

19. The process for preparing the PPE copolymer as claimed in claim 18, wherein the tertiary amine is triethylamine.

20. The process for preparing the PPE copolymer as claimed in claim 15, wherein the organic solvent is toluene or xylene.

21. The process for preparing the PPE copolymer as claimed in claim 15, wherein the monomer (c) is 2-allyl-6-methylphenol.

22. The process for preparing the PPE copolymer as claimed in claim 15, wherein the monomer (c) is 2-isopropylphenol.

23. A resin composition comprising:

a) PPE copolymer: represented by the following formula (V)

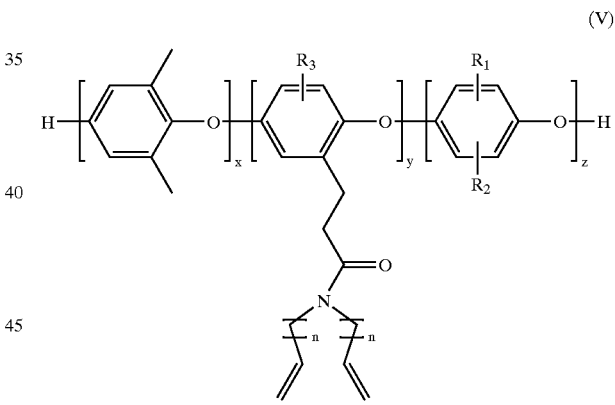

(V)

wherein x, y and z each represent mole percentage of each repeating unit, where x is from 1 to 80%, y is from 1 to 10% and z is from 1 to 40%, provided that the sum of x, y and z is 100%, n is 0 or an integer from 1 to 10, $R_1$ represents H, or $C_1$–$C_{10}$ linear or branched alkyl group, $R_2$ represents H, $C_1$–$C_{10}$ linear or branched alkyl group, or $C_2$–$C_{10}$ linear or branched alkenyl group, and $R_3$ represents H, or $C_1$–$C_{10}$ linear or branched alkyl group; and b) a free radical initiator present in an amount ranging from 0.5 to 95% by weight of the resin composition.

24. The resin composition as claimed in claim 23, wherein the free radical initiator is 2,5-dimethyl-2,5-di-tert-butylperoxy-hexane (DHBP), di-tert-butylperoxide (DTBP), di-cumylperoxide (DCP), or benzoylperoxide (BPO).

25. The resin composition as claimed in claim 23, further comprising a hardener present in an amount ranging from 5 to 95% by weight of the resin composition.

26. The resin composition as claimed in claim 25, wherein the hardener is triallyl isocyanurate (TAIC) or triallyl cyanurate (TAC).

27. The resin composition as claimed in claim 23, wherein $R_1$ is H, $R_2$ is allyl group, and $R_3$ is H.

28. The resin composition as claimed in claim 23, wherein $R_1$ is H, $R_2$ is an isopropyl group, and $R_3$ is H.

29. A resin composition comprising:
a) PPE copolymer: represented by the following formula (VII)

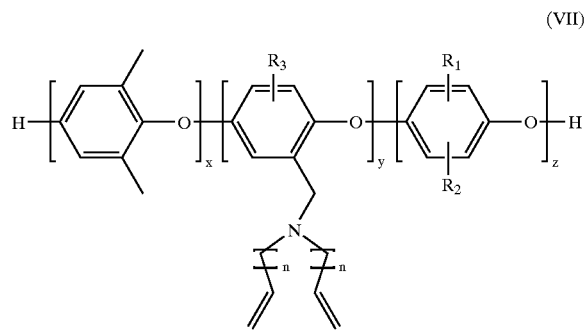

(VII)

wherein
x, y and z each represent mole percentage of each repeating unit, where x is from 1 to 80%, y is from 1 to 10% and z is from 1 to 40%, provided that the sum of x, y and z is 100%, n is 0 or an integer from 1 to 10, $R_1$ represents H, or $C_1$–$C_{10}$ linear or branched alkyl group, $R_2$ represents H, $C_1$–$C_{10}$ linear or branched alkyl group, or $C_2$–$C_{10}$ linear or branched alkenyl group, and $R_3$ represents H, or $C_1$–$C_{10}$ linear or branched alkyl group; and b) a free radical initiator present in an amount ranging from 0.5 to 95% by weight of the resin composition.

30. The resin composition as claimed in claim 29, wherein the free radical initiator is 2,5-dimethyl-2,5-di-tert-butylperoxy-hexane (DHBP), di-tert-butylperoxide (DTBP), di-cumylperoxide (DCP), or benzoylperoxide (BPO).

31. The resin composition as claimed in claim 29, further comprising a hardener present in an amount ranging from 5 to 95% by weight of the resin composition.

32. The resin composition as claimed in claim 31, wherein the hardener is triallyl isocyanurate (TAIC) or triallyl cyanurate (TAC).

33. The resin composition as claimed in claim 29, wherein $R_1$ is H, $R_2$ is allyl group, and $R_3$ is H.

34. The resin composition as claimed in claim 29, wherein $R_1$ is H, $R_2$ is an isopropyl group, and $R_3$ is H.

* * * * *